(12) United States Patent
Mouille

(10) Patent No.: US 7,918,417 B2
(45) Date of Patent: Apr. 5, 2011

(54) UNDERCARRIAGE WITH ANTICRASH AND ANTIRESONANCE SKIDS FOR A ROTARY WING AIRCRAFT, AND AN AIRCRAFT

(75) Inventor: René Mouille, Aix En Provence (FR)

(73) Assignee: Eurocopter, Marignane Cedex (FR)

( * ) Notice: Subject to any disclaimer, the term of this patent is extended or adjusted under 35 U.S.C. 154(b) by 822 days.

(21) Appl. No.: 11/526,573

(22) Filed: Sep. 26, 2006

(65) Prior Publication Data

US 2010/0237190 A1    Sep. 23, 2010

(30) Foreign Application Priority Data

Sep. 28, 2005   (FR) ...................................... 05 09917

(51) Int. Cl.
  *B64C 25/52*    (2006.01)
(52) U.S. Cl. ...................................... 244/108; 244/17.17
(58) Field of Classification Search ................... 244/108, 244/17.11, 139, 140, 17.17
See application file for complete search history.

(56) References Cited

U.S. PATENT DOCUMENTS

| | | | | |
|---|---|---|---|---|
| 2,641,423 | A * | 6/1953 | Bassett et al. | 244/100 R |
| 3,173,632 | A * | 3/1965 | Woods | 244/100 R |
| 3,716,208 | A * | 2/1973 | Fagan et al. | 244/108 |
| 4,519,559 | A * | 5/1985 | Logan et al. | 244/17.17 |
| 4,558,837 | A | 12/1985 | Mens et al. | |
| 4,645,143 | A * | 2/1987 | Coffy | 244/100 R |
| 4,821,983 | A | 4/1989 | Aubry et al. | |
| 5,211,359 | A * | 5/1993 | Rene et al. | 244/108 |
| 5,224,669 | A | 7/1993 | Guimbal et al. | |
| 5,860,621 | A * | 1/1999 | Barquet et al. | 244/17.17 |
| 5,897,077 | A * | 4/1999 | Head | 244/17.17 |
| 6,244,538 | B1 * | 6/2001 | Howard et al. | 244/17.17 |
| 6,427,942 | B2 * | 8/2002 | Howard et al. | 244/17.17 |
| 6,776,370 | B2 * | 8/2004 | Struzik et al. | 244/17.27 |
| 2007/0228210 | A1 * | 10/2007 | Mast et al. | 244/1 R |

FOREIGN PATENT DOCUMENTS

WO   WO 2004/106769    12/2004

\* cited by examiner

*Primary Examiner* — Tien Dinh
*Assistant Examiner* — Joseph W Sanderson
(74) *Attorney, Agent, or Firm* — Brooks Kushman P.C.

(57) ABSTRACT

An undercarriage (2) having anticrash and antiresonance skids (6) for a rotary wing aircraft (1), the undercarriage including in particular:
  two landing skids (6) that are elastically deformable in the event of a normal landing;
  front and rear transverse elements (7, 8) likewise elastically deformable in the event of a normal landing;
  assembly elements (9, 14) for assembling the transverse elements to a force take-up structure (5) of the aircraft (1); and
  a connection system (10) suitable for absorbing the energy of a crash landing by controlled plastic deformation and including at least one pair of buckling struts (11) arranged so as to deform in the plastic range by buckling, together with a fastener member (14) of the assembly elements for providing statically-redundant assembly between a structure (5) of the aircraft (1) and a respective one of the front and/or rear elements (7, 8).

20 Claims, 1 Drawing Sheet

U.S. Patent        Apr. 5, 2011        US 7,918,417 B2
Fig.1
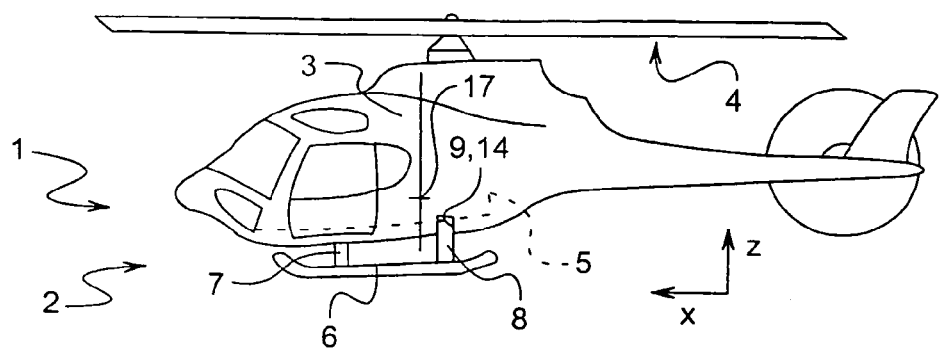
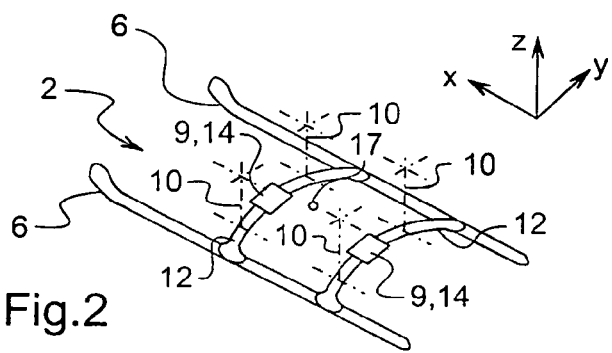
Fig.2
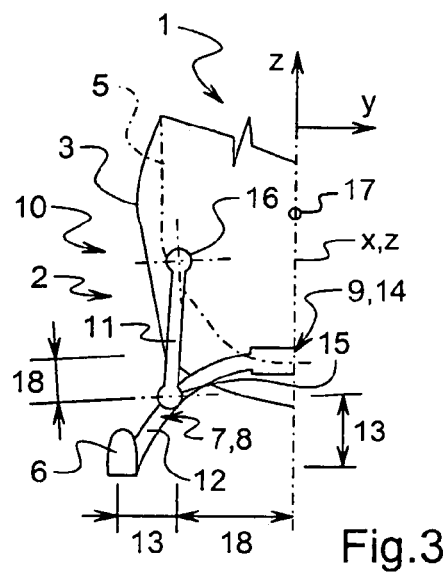
Fig.3
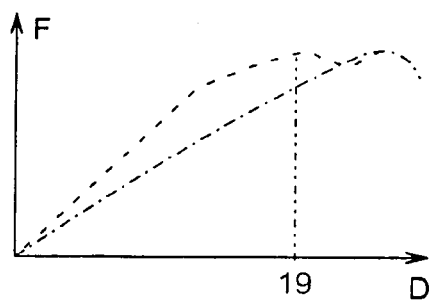
Fig.4
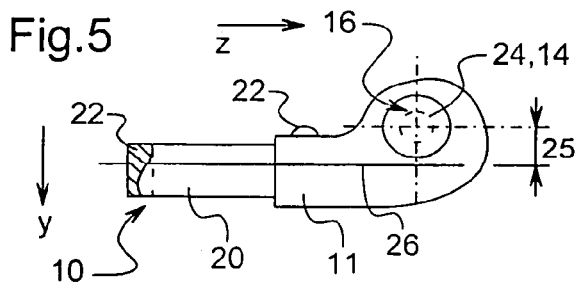
Fig.5
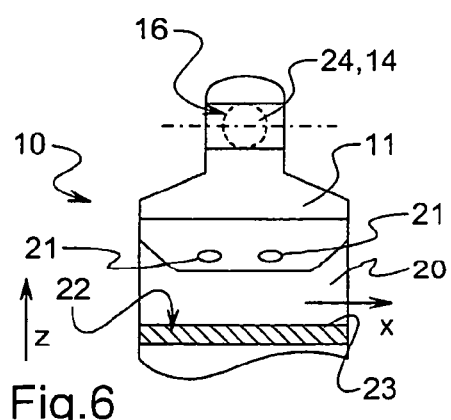
Fig.6

UNDERCARRIAGE WITH ANTICRASH AND ANTIRESONANCE SKIDS FOR A ROTARY WING AIRCRAFT, AND AN AIRCRAFT

The invention relates to the field of rotary wing aircraft undercarriages, also referred to as "landing gear".

BACKGROUND OF THE INVENTION

In general, rotary wing aircraft of heavy or medium tonnage possess wheeled undercarriages.

It is not unusual for lighter aircraft to have undercarriages of the friction skid type.

A skid undercarriage is in principle mechanically less complex than a wheeled undercarriage, lighter in weight, and often constitutes a solution that is advantageous for landing on a variety of surfaces.

Skid undercarriages have been commonplace for many years, and were already mounted on rotorcraft such as those of B. N. Yuriev in 1910 or of Louis Brennan in 1924, or indeed in 1947 in the SNIAS SE3110M helicopter.

To summarize, a skid undercarriage comprises at least two transverse elements secured to a force take-up structure of the aircraft, and having mounted thereon a pair of longitudinally extending friction skids, for example. These skids may optionally be united at the front by a junction section referred to as a "mustache".

Like wheeled undercarriages, and under certain conditions, skid undercarriages (and consequently rotary wing aircraft) are subjected to a phenomenon of dynamic instability known as ground resonance, with this applying in particular on helicopters for which the main rotor that provides thrust and lift is a "hinged" rotor.

This ground resonance phenomenon can occur while the rotor(s) is being brought up to speed, and above all during landing at the moment of making contact with the ground.

In the event of ground resonance, the rotor(s), the engine(s), and the gearbox(es) are subjected to vibrations that propagate through the aircraft, in particular within its force take-up structure.

It is known that each element of the aircraft, including its undercarriage, presents its own resonant frequency of vibration that depends in particular on its mass, and on its flexibility or stiffness, which are themselves a function of the shape, the dimensions, and the component materials of the element.

As a result, complex vibration can be added to or subtracted from the vibration of the aircraft as a whole so that the level of vibration increases or decreases accordingly.

In flight, the aircraft is isolated, and for any given flying speed, the level of vibration always stabilizes.

In contrast, when the aircraft is on the ground with its (main) propulsion and lift rotor(s) revolving, the vibration finds a reaction point on the landing surface that acts through the undercarriage.

Under such circumstances, the resonant frequency of the undercarriage can be in tune with the frequency of the main vibrations coming from the main propulsion and lift rotor.

In the event of the frequency of the rotor being in tune with the resonant frequency of the undercarriage, the vibration acting on the undercarriage receives additional impulses in reaction on each revolution of the blades of the main rotor.

Under such conditions, the amplitude of vibration increases quickly. Such diverging vibration and the resulting oscillation can lead to the aircraft tipping over suddenly, which can destroy it.

The risk of ground resonance appearing is greater while setting the propulsion and lift rotor(s) into motion, since frequency then rises relatively slowly. In contrast, on landing, frequency variation takes place much more quickly, so the risk of ground resonance is smaller.

More precisely, it is considered that such tilting is most likely to occur when the following frequencies are matched:
the frequency of a first mode in rolling of the aircraft, written "$\omega x$"; and
the value written "$\Omega$" representative of the speed of rotation of the main rotor at a given instant.

These considerations concerning ground resonance lead to various types of undercarriage being classified as to whether they present "subcritical" or "supercritical" behavior.

Thus, in a subcritical skid undercarriage for a rotary wing aircraft, it is desired that below a nominal speed of rotation for the main rotor of the aircraft, having a value written $\Omega n$;
the value (in radians per second, written rad/s) of the frequency of the first mode in rolling $\omega x$ of the aircraft is greater than:
the difference between firstly, the value $\Omega$ (in rad/s) of the speed of rotation of the main rotor; and
secondly, the value written "$\omega \delta$" (in rad/s) of the frequency of a first mode in lag of the blades (i.e. the frequency of lag oscillations of the blades).

For the main rotor of a rotorcraft, the frequency $\omega \delta$ of its first lag mode is of the order of half the value written "$\Omega n$" representing the nominal speed of rotation of the rotor (where the approximation is written "$\pm$").

In this context, the following equation can be written:

$$\omega x > \Omega - \omega \delta = \pm 0.5 \Omega n$$

In addition, in a rotary wing aircraft, in the event of an engine failure, it is appropriate to consider that the aircraft is put into an autorotation mode in order to limit the consequences of a hard landing, with the speed of rotation of the rotor in autorotation being written "$\Omega a$", with this speed being greater than the nominal speed of rotation $\Omega n$ of the main rotor by a factor "k".

As a result, in autorotation, the absolute value of $\Omega a - \omega \delta$ comes very close to the frequency of the first mode in rolling $\omega x$ so that the risk of ground resonance increases in the event of a hard landing in autorotation.

The same applies when the in-flight weight of a rotary wing aircraft is increased, in particular by adding heavy equipment on the aircraft such as weapons, or when there is a decrease in the second moment of area or the stiffness of the aircraft— including that of its undercarriage.

Under all acceptable flying configurations, it is necessary to maintain a sufficient safety margin.

Maintaining this safety margin for subcritical skid undercarriages, i.e. the margin between the absolute value $|\Omega - \omega \delta|$ and the value of the frequency of the first mode in rolling $\omega x$, generally requires damping to be added between the transverse elements of the landing gear and the force take-up structure.

Thus, subcritical skid undercarriages with damping have been proposed and are said to be "rigid" or "stiff".

By way of example, this applies to the skid undercarriage fitted to the AS350 Ecureuil helicopter.

On that aircraft, the single front transverse element is mounted internally via clamps on beams of a bottom section of the force take-up structure, while two dampers provide a transverse outside connection between said front transverse element and a partition of said structure.

At the rear, another single transverse element is mounted via clamps to a transversely central portion of the force take-up structure. It should be observed that such a skid undercarriage of the subcritical and rigid type is typically associated with flexible blades at the rear ends of the skids, as described in document FR 2 372 081 mentioned below.

Furthermore, for a skid undercarriage that is not subcritical but is instead supercritical, it is desirable for the value of the frequency of the first mode in rolling ωx to remain less than the absolute value of the difference between Ω and ωδ, which can be written:

$$\omega x < |\Omega - \omega \delta|$$

In other words, with supercritical skid undercarriages, it is desirable for the frequency values Ω associated with the speed of rotation of the main rotor and ωδ of the first lag mode to pass through the value ωx of the frequency of the first roll mode (which in this case is about 0.6 times the nominal rotor frequency Ωn).

This frequency is passed through quickly because of the high accelerations and decelerations in the speed of rotation of the main rotor, respectively during takeoff and landing of the aircraft.

As a result, and under such circumstances, the normal rates of damping do not require to be as great as they do with a skid undercarriage that is subcritical and rigid.

With a supercritical skid undercarriage there is a stiffness factor "K" such that the value ωx of the frequency of the first mode in rolling is equal to the square-root of the ratio between the value of said stiffness factor K and the weight M of the aircraft.

In theory, it is therefore possible to obtain a supercritical skid undercarriage without dampers that is acceptable from the ground resonance point of view, providing it presents suitable flexibility.

For example, such an approach of the supercritical type is applied to the skid undercarriage of the AS342 Gazelle helicopter which is flexible and passes through a resonance mode.

In the AS342 Gazelle aircraft, the front transverse element is rigidly mounted to the force take-up structure via two clamps that are spaced apart transversely.

However, transversely outside those clamps, the front transverse element includes a universal joint between each skid front portion and the rigid mount location.

The universal joint provides a degree of flexibility to the ends where the skids are secured to the transverse element, and thus allow the fronts of the skids to move elastically.

At the rear, transversely on either side of a top fitting of the force take-up structure where a side brace is hinged, the rear transverse element is connected via two junction clamps to said structure.

This reduces the resonant frequency of the skids, which frequency is kept below the nominal rotation frequency of the main rotor.

Various prior art examples of skid undercarriages are mentioned below.

Document FR 1 578 594 describes a landing gear for a helicopter with skids that serve to damp the impact of landing.

To ensure that all the twisting forces are absorbed by the skids, that landing gear possesses two front elements forming offset cross-members and at least one rear transverse element, the skid being connected to said elements.

The transverse elements are pivotally mounted to the force take-up structure of the helicopter, and dampers are associated with the rear transverse element to attenuate bouncing and ground resonance of the aircraft.

Drag struts going from the structure of the helicopter to the rear transverse element are added to the landing gear, e.g. by being integrated with the rear transverse element, in order to increase the rigidity thereof in yaw and to attenuate ground resonance.

Document FR 2 372 081 describes skid landing gear of the subcritical and rigid type.

In order to damp resonance and impacts on landing on the ground, flexible blades are secured to the rear end of each skid.

Document FR 2 537 542 describes a skid undercarriage for a helicopter with a device for absorbing energy in the event of a crash landing or a hard landing.

In order to limit stresses in a force take-up structure of the aircraft, the energy absorption device is suitable for being subjected to plastic deformation, and it includes at least one damper component, e.g. a hydraulic damper.

With that device, it is desired to avoid the skid support cross-members buckling in compression.

Document FR 2 647 170 seeks to reduce the flexibility of such a damper, e.g. in the context of naval applications, for example.

Document GB 726 573 describes such an aircraft main undercarriage with a pair of frames that are symmetrical about the longitudinal midplane of the aircraft, and with friction skids or beams.

The frames of the landing gear are associated with means for damping irregularities in the landing surface and for damping twisting forces about their hinge axes.

Document U.S. Pat. No. 2,641,423 describes a skid undercarriage for a helicopter that is suitable for providing anti-crash functions by irreversible plastic deformation, but without buckling of horizontal cross-members made of aluminum.

Document U.S. Pat. No. 3,716,208 describes a skid landing gear for a helicopter.

That landing gear includes a damper, and a tubular member suitable for absorbing certain forces in the event of a crash landing by measured plastic deformation.

Document U.S. Pat. No. 4,519,559 describes an actuator device arranged to reestablish the stability of a helicopter resting on its skid landing gear.

Each of the skids has two pairs of cross-member elements, with each element being hinged to the take-up structure about a longitudinal axis.

The actuators are interposed between the force take-up structure of the helicopter and the cross-member side elements.

A connection between these elements and each actuator is disposed between the axis of rotation of the element and its respective skid.

In the light of the above, it will be understood firstly that rigid skid undercarriages are often too heavy, too bulky, and too expensive for certain rotary wing aircraft, such as light helicopters.

In contrast to such rigid skid undercarriages, the term "flexible skid undercarriage" is used herein to designate an undercarriage in which energy absorption during a normal landing, a hard landing, or a crash landing is performed solely by transverse elements, skids, and other connection systems deforming in a manner that is elastic or plastic, and without involving any adjoining dampers, side braces, or the like.

Secondly, it will thus be understood that at present no flexible skid undercarriage (i.e. not including a damper) is available that is entirely acceptable in practice, whether from the ground resonance point of view or from the point of view of its specific anticrash behavior.

Complying with one of those criteria conflicts with complying with the other, since such an undercarriage must be capable of deforming flexibly so as to avoid being excessively sensitive to ground resonance, and must also present sufficient strength to absorb the energy involved in a crash landing or a hard landing.

OBJECTS AND SUMMARY OF THE INVENTION

An object of the invention is to solve that paradox, while preserving the qualities specific to supercritical undercarriages without shock absorbers in terms of simplicity, lightweight, versatility (in particular in terms the surfaces on which it can land), and costs (both production and maintenance).

To this end, the invention provides an undercarriage for a rotary wing aircraft, the undercarriage being flexible and comprising at least:

two landing skids (6), each being disposed substantially in a longitudinal direction laterally on a respective side of a longitudinal midplane in elevation of the undercarriage (2), each skid (6) being suitable for absorbing a fraction of the energy that is applied thereto during a landing under normal conditions by deforming elastically;

a front transverse element (7) disposed substantially in a plane perpendicular to the longitudinal direction of the undercarriage (2) and suitable for absorbing the energy that is applied thereto during a landing under normal conditions by deforming elastically;

a rear transverse element (8) disposed substantially like the front transverse element (7) and suitable for absorbing the energy that is applied thereto during a landing under normal conditions by deforming elastically;

assembly means (9) for assembling coupling the front and rear transverse elements (7, 8) to a force take-up structure (5) of the corresponding aircraft (1); and a connection system (10) for connecting the undercarriage (2) to the force take-up structure (5) of the corresponding aircraft (1) and suitable for absorbing the energy that is applied thereto during a crash by deforming plastically in controlled manner;

wherein provision is made for:

the connection system (10) to comprise comprises at least one of a pair of front and/or and rear buckling struts (11), each strut (11) being disposed substantially in an elevation direction (Z) and in such a manner as to deform in the plastic range by buckling;

the front transverse element (7) to present transversely on either side of the undercarriage (2) an endpiece section (12) that defines an offset (13) that is outwards transversely and downwards in elevation relative to the front assembly means (9), and where appropriate to a bottom hinge (15) of the front pair of buckling struts (11);

the rear transverse element (8) to present transversely on either side of the undercarriage (2) an endpiece section (12) that defines an offset (13) that is outwards transversely and downwards in elevation relative to the rear assembly means, and where appropriate to a bottom hinge of the rear pair of buckling struts (11); and the assembly means (9) to present transversely at least between the buckling struts (11) of at least one of a front and/or and rear pair of the buckling struts, respectively at least one fastener member (14) for providing statically-redundant assembly between the force take-up structure (5) of the corresponding aircraft (1) and the respective at least one of front and/or rear elements (7, 8).

In an embodiment, the undercarriage is arranged so that energy absorption during a normal landing, a hard landing, or a crash landing takes place exclusively in the transverse elements, the skids, and the buckling struts by deformation that is elastic or plastic, and without involving adjoining shock absorbers, side braces, or the like.

One variant provides for the undercarriage to be of the type presenting subcritical performance.

Another variant provides for the undercarriage to be of the type presenting supercritical performance.

In an embodiment, the undercarriage makes provision for:

at least one of a pair of rear and/or and front buckling struts (11) to be provided with bottom and top hinges (15, 16) forming part of the assembly means (9), said bottom and top hinges (15, 16) being disposed with a predetermined amount of overhang (18) or skid base transversely relative to the respective at least one of rear and/or and the front statically-redundant fastener members (14); and transversely (Y) on either side of the at least one of rear and/or and the front statically-redundant fastener members (14), the at least one of front and/or rear transverse elements (7, 8) to be provided with overhang (18) downwards in elevation and outwards transversely.

In another embodiment:

each skid (6) is adapted to absorb a fraction of the energy which is applied thereto during a landing under normal conditions by deforming elastically essentially or completely in twisting; and/or and the at least one of front and/or rear transverse elements (7, 8) is suitable for absorbing the energy which is applied thereto during a landing under normal conditions by deforming elastically essentially or completely in bending.

In an embodiment, the undercarriage (2) possesses the at least one said pair of rear buckling struts (11), the assembly means (9) comprising at the front at least one of the front statically-redundant fastener member (14), e.g. fastening by mutual engagement and/or by a ball joint assembly (24), and optionally an arrangement for reinforcing the front transverse element (7).

In another embodiment, the undercarriage (2) possesses at least one pair of said front buckling struts (11), the assembly means comprising at the rear at least one of the rear statically-redundant fastener member (14), and a ball joint assembly (24), and optionally an arrangement reinforcing the rear transverse element. In yet another embodiment, the undercarriage possesses at least one front pair of buckling struts and at least one rear pair of buckling struts.

In another embodiment, at least one of the pair of rear and front buckling struts (11) of the connection system (10) is arranged in such a manner as to deform in the plastic range by buckling at constant force.

In yet another embodiment, at least one of a pair of rear and front buckling struts (11) of the connection system (10) is arranged in such a manner as to deform in the plastic range by buckling in the event of the forces becoming greater than a predetermined threshold corresponding to a hard landing or a crash landing, with said pair of struts (11) being arranged so that the deformation remains elastic and is free from buckling or non-existent so long as the forces remain below said predetermined threshold In an embodiment, each of the buckling struts (11) of at least one of said front and rear pair of said buckling struts presents a deformable body (20), and of section (22) that is polygonal.

Depending on the embodiment, a buckling strut deformable body (20) in at least one of said front and rear pair of said buckling struts is made essentially of steel or of a composite material including glass or carbon fibers.

In another embodiment, the at least one pair of said front and rear buckling struts (11) is provided with bottom and top hinges (15, 16), at least one of which comprises a ball joint (24).

In an embodiment, at least one ball joint (24) of a buckling strut hinge presents a pivot center that is perceptibly off-center (25) transversely.

In an embodiment, the undercarriage (2) possesses said two landing skids (6) united at the front by the front transverse element (7) referred to as a "mustache".

The invention also provides an aircraft, e.g. a rotary wing aircraft, said aircraft including a flexible skid undercarriage as specified above.

According to the invention, the rear and front fastener members are disposed transversely close to a longitudinal midplane in elevation of the aircraft and substantially longitudinally on either side of a center of gravity of said aircraft.

In the above, it can be understood that the invention makes it possible to obtain a skid undercarriage for a rotary wing aircraft that is suitable for presenting exceptional safety with respect both:
 to its behavior in the face of ground resonance; and
 to its behavior in the event of a hard landing or a crash landing.

Such a skid undercarriage is particularly well adapted to helicopters having a hinged main rotor for propulsion and lift purposes.

In both cases, the risk of unacceptable damage to humans and/or equipment is greatly reduced.

Similarly, the invention makes it possible for safety standards, both present and future, to be complied with in order to enable an aircraft of the invention to be certified easily and quickly.

BRIEF DESCRIPTION OF THE DRAWING

The invention is described below with reference to embodiments given by way of non-limiting examples and shown in the accompanying drawings.

FIG. 1 is a diagrammatic longitudinal elevation view of a rotary wing aircraft in accordance with the invention, specifically a helicopter, shown in side view with its front end or "nose" to the left and its rear end or "tail" to the right.

FIG. 2 is a diagrammatic rear perspective view of a skid undercarriage in accordance with the invention on which various options for positioning front and/or rear pairs of buckling struts are marked in fine chain-dotted lines.

FIG. 3 is a fragmentary diagrammatic view in elevation cross-section of a rotary wing aircraft of the invention, longitudinally in register with a thrust path fitted with buckling struts, and showing dispositions involving:
 end sections offset outwardly and in elevation;
 a transverse skid base; and
 overhang.

FIG. 4 is a graph with displacement as a result of plastic deformation plotted along the abscissa and force values in the event of a crash plotted along the ordinate, showing firstly a generally lower chain-dotted line applicable to a conventional connection system (cross-member only), and secondly a generally higher dashed-line applicable to a pair of undercarriage buckling struts in accordance with the invention, the areas between the curves and the abscissa illustrating the energy absorbed in the event of a crash respectively by such a conventional connection system and by the pair of buckling struts of the invention.

FIG. 5 is a fragmentary transverse elevation view showing the front of a strut with a ball joint in an undercarriage of the invention, showing clearly the pivot axis of said ball joint located offcenter transversely relative to the neutral fiber of the strut.

FIG. 6 is a fragmentary longitudinal elevation view of an undercarriage strut of the invention, showing clearly the polygonal longitudinal cross-section of the deformable body of the strut, in this case a section that is rectangular.

MORE DETAILED DESCRIPTION

Embodiments of the invention are described below.

In the drawings, where elements that are similar are given the same reference numerals, there can be seen three mutually orthogonal directions.

A first direction Z, referred to as "elevation", corresponds to the height and the thickness of the structures described: terms such as up/down or lower/upper are relative thereto. For simplification purposes, this direction Z is sometimes said to be vertical.

Another direction X referred to as being "longitudinal" corresponds to the length or the main dimension of the structures described. Terms such as front/rear are relative thereto. For simplification purposes, this direction X is sometimes said to be horizontal.

Yet another direction Y, said to be "transverse", corresponds to the width or lateral dimension of the structures described. The term "side" is relative thereto. For simplification purposes, this direction Y is sometimes said to be horizontal.

The directions X and Y together define a "main" plane (X,Y) extending perpendicularly to the sheet on which FIG. 1 is drawn, within which there is inscribed the lift polygon and a landing plane.

In FIGS. 1 to 3, reference 1 is an overall reference designating a rotary wing aircraft. Specifically, the aircraft 1 is an helicopter.

In FIGS. 1 to 6, an undercarriage or landing gear is given overall reference 2.

Within the aircraft 1, there can be seen in particular in FIG. 1: a fuselage 3, and a main rotor 4 for providing propulsion and lift.

Reference 5 designates a force take-up structure that imparts to the fuselage 3 of the aircraft 1 the desired stiffness and safe behavior in the event of a crash.

Conventionally, the force take-up structure 5 participates directly or indirectly in mounting the main rotor 4 on the aircraft.

In FIG. 1, the undercarriage 2 comprises in particular:
 two skids 6;
 a front transverse element 7;
 a rear transverse element 8;
 assembly means 9 for assembling the transverse elements 7 and 8 to the force take-up structure 5; and
 an anticrash connection system 10.

It is emphasized at this point that the undercarriage 2 is flexible, i.e. it is arranged in such a manner that energy absorption during a normal landing, a hard landing, or a crash is performed solely via the transverse elements 7 and/or 8, the skids 6, and the buckling struts 11 (shown in FIGS. 3, 5, and 6) by deformation that is elastic or plastic.

In other words, the undercarriage 2 of the invention does not have any adjoining shock absorbers, side braces, or the like.

One variant provides for the undercarriage 2 to be of the type presenting subcritical behavior. Another variant provides for the undercarriage 2 to be of the type presenting supercritical behavior.

Naturally, the invention applies equally well to landing gear 2 having a cross-member made up of two distinct left and right elements, e.g. at the front or at the rear, or having duplicated skids, and/or skids that are united by an additional section member known as a "mustache".

The undercarriage 2 with skids 6 presents flexibility that is acceptable from the ground resonance point of view, this flexibility being local as described below.

Each skid 6 in this undercarriage is suitable for absorbing a fraction of the energy that is applied thereto during landing of the aircraft 1 under normal conditions, and to do so by deforming elastically.

In addition to the skids 6, the transverse elements 7 and 8 are each suitable for absorbing the energy that is applied thereto during a landing under normal conditions by deforming themselves elastically.

In contrast, the system 10 for connecting the undercarriage to the structure 5 seeks to absorb the fraction of the energy that is applied thereto during a crash landing by deforming plastically in controlled manner.

FIG. 2 shows clearly that each of the skids 6 is disposed substantially along the longitudinal direction X and extends laterally on a respective side of the midplane (X,Z) in longitudinal elevation of the undercarriage 2 or of the aircraft 1.

The front transverse element 7 is disposed substantially in a plane perpendicular to the longitudinal direction X in front of the center of gravity 17 of the aircraft 1.

Similarly, the rear transverse element 8 is disposed substantially in another plane perpendicular to the direction X, but longitudinally behind the center of gravity 17.

Each element 7 or 8 defines a respective front or rear thrust path.

The assembly means 9 serve to mount the force take-up structure 5 on the front and rear elements 7 and 8. It is thus these means 9 that enable the undercarriage 2 to be assembled under the aircraft 1.

In accordance with the invention, it is desired to ensure that the so-called "flexible" portions of the undercarriage 2, i.e. those closest to the surface on which the aircraft 1 is landing, present a capacity for elastic deformation (often by deforming in twisting) suitable for damping landing under normal conditions.

However, within the undercarriage 2, zones are also provided for plastic deformation (often in bending), which zones are capable of absorbing forces in the event of a hard landing, typically in the event of autorotation.

Finally, zones are arranged in the undercarriage 2 that are deformable in buckling and suitable for absorbing forces in the event of a crash landing.

As a result, depending on the magnitude of the landing forces applied to the undercarriage 2 of the invention, energy is absorbed distinctly and so to speak "selectively" either by the flexible portions, or by the plastic deformation zones of the elements 7 or 8, or else by the buckling struts 11, depending on how the aircraft comes into contact with the surface on which it is landing.

In other words, functionally distinct portions and zones of the undercarriage 2 act in dedicated manner to absorb the energy associated with each given type of landing (normal, hard, crash).

For this purpose, the undercarriage 2 provides for:
  the connection system 10 to comprise at least one pair of bulking struts 11 on the rear and/or front thrust path;
  the transverse elements 7 and 8 each present transverse end sections 12 defining an offset 13 (see FIG. 3); and
  the assembly means 9 possess transversely at least one fastener member 14 for providing statically-redundant assembly between the structure 5 and the elements 7 and 8.

Depending on the embodiment, such a statically-redundant fastener member at the front and/or at the rear is in the form of a component providing assembly by interfitting or via a ball joint (24).

It should also be observed that in the aircraft 1 of FIG. 1 these front and rear statically-redundant fastener members 14 are arranged transversely close to the longitudinal midplane in elevation of the aircraft 1, and substantially longitudinally on either side of the center of gravity 17 of the aircraft 1 (see FIG. 3).

From a functional point of view, it can already be seen that:
  each of these end sections 12 having an offset 13 forms a distinct portion of the undercarriage 2 that is dedicated to absorbing the energy associated with a normal landing by deforming elastically;
  likewise each of the endpiece sections 12 with an offset 13 defines a distinct zone of the undercarriage 2 that is dedicated to absorbing the energy associated with a hard landing by deforming plastically, without buckling; and
  each pair of struts 11 forms a distinct zone of the undercarriage 2 dedicated to absorbing the energy associated with a crash, by deforming plastically in buckling.

In FIGS. 1 to 3, the buckling struts 11 are arranged to extend substantially in the elevation direction Z.

In a variant, the undercarriage 2 possesses on the front thrust path a pair of buckling struts 11 and a front statically-redundant fastener member 14.

In this variant, an arrangement (not shown) may optionally be provided for reinforcing the rear transverse element 8, such as a drag strut or some other member for optimizing flexibility.

In a different variant, the undercarriage 2 possesses, on the rear thrust path, a pair of buckling struts 11 and a fastener member 14 that is made statically-redundant by mutual engagement. On the front thrust path, an arrangement may optionally be provided for optimizing flexibility.

As an alternative to these variants in which only one of the front or rear thrust paths possesses buckling struts 11, provision could be made for the other, or "no buckling", thrust path (respectively rear or front) nevertheless to include a statically-redundant fastener member 14.

A further variant of the undercarriage 2 possesses a pair of buckling struts 11 on the front thrust path and also on the rear thrust path. These front and rear thrust paths are also each provided with respective statically-redundant fastener members 14.

In most embodiments, the rear and/or front buckling struts 11 of the connection system 10 are arranged in such a manner as to deform plastically by buckling under substantially constant force.

Below there follow details of the overhang portions and of the controlled deformation zones of the undercarriage 2 and how they perform their dedicated energy absorption.

With reference to FIG. 3, it can be seen that in order to absorb energy during normal landings of the aircraft 1, a transverse element 7 or 8 presents on either side of the undercarriage 2, transversely in the Y direction, an endpiece section 12 that defines an offset 13.

Each offset 13 of endpiece section 12 projects transversely (Y) outwards from the aircraft 1, and also downwards in elevation in the direction Z, relative to the assembly means 9 of the corresponding front or rear thrust paths.

The offset 13 as shown in FIG. 3 is substantially in the form of a circular arc, extending from a bottom hinge 15 of the buckling strut 11 hinging the strut to the transverse element 7 or 8 of the thrust path.

The circular arc formed by the offset 13 extends downwards on going transversely outwards from within the aircraft 1 or the undercarriage 2.

It can be understood that during a normal landing, forces are applied on the skids 6 connected to the offset 13.

This causes the transverse elements 7 or 8 to bend in the elastic range, thereby achieving the desired absorption of energy.

This bending takes place substantially around the bottom hinge 15, in a direction that is clockwise in FIG. 3. There is then no significant elastic or plastic deformation within the remainder of the undercarriage 2, except sometimes elastic deformation of the skids 6 in twisting.

During a hard landing, forces are applied to the skids 6 that above a predetermined threshold of flexibility that can be accepted by the undercarriage 2.

This leads to irreversible bending of the offset 13 of the end piece sections 12 in the plastic range, and thus to the desired energy absorption.

This also involves bending that takes place substantially around the bottom hinge 15, clockwise in FIG. 3.

There is then no additional elastic or plastic deformation within the transverse elements 7 and 8, in particular between the two hinges 15 of a given thrust path of the undercarriage 2, i.e. in the vicinity of the fastener members 14 transversely on either side.

It is recalled at this point that these fastener members 14 of the assembly means 9 are generally disposed transversely between the buckling struts 11 of one or other of the front and/or rear thrust paths, and that they serve to provide statically-redundant assembly between the force take-up structure 5 of the corresponding aircraft and the front and/or rear elements 7 and/or 8, respectively.

It can be seen clearly in FIG. 3 that the transverse elements 7 and 8 are disposed transversely (Y) on either side of the rear and/or front statically-redundant fastener members 14 with overhang 18 in elevation downwards and transversely outwards.

Where appropriate, and for simplification purposes, each of the two overhang portions 18 of a given thrust path is extended between the bottom hinges 15 of the rear and/or front buckling struts 11.

Because the overhang portions 18 of the elements 7 or 8 are defined outwards and downwards by the hinges 15 of the buckling struts 11, and inwards and upwards by the fastener members 14 of the corresponding paths, these zones are not suitable for being subjected to a large amount of elastic deformation.

In contrast, the overhang portions 18 are subjected to considerable plastic deformation during a crash landing once forces exceeding a predetermined buckling threshold are applied to the undercarriage 2 via the skids 6.

This leads to irreversible bending of the overhang portions 18 in the plastic range, and thus to the desired absorption of energy.

However, this irreversible deformation of the overhang portions 18 requires the strut 11 within a given thrust path to buckle.

In fact, in the event of a crash, the absorption of energy by the buckling struts 11 (produced by each bottom hinge 15 of the buckling struts 11 being moved by the buckling force) is in addition to the energy absorption due to the plastic deformation in bending of the overhang portions 18.

This contributes to providing a flexible undercarriage 2 that possesses excellent efficiency, as can be seen from FIG. 4.

It should be observed that in FIG. 4, reference 19 designates the (design) rupture point of the buckling struts 11.

In the graph of FIG. 4, which applies to a crash landing, the force levels on a conventional connection system are well below those obtained by an undercarriage 2 having undercarriage buckling struts 11 in accordance with the invention.

The areas between the curves and the abscissa D representing the energy absorbed in a crash landing respectively by such a conventional connection system and by the pair of buckling struts 11 of the invention are considerably greater for the invention than for prior art systems.

This observation can be optimized by specific additional features set out below.

In one embodiment, the undercarriage 2 provides for at least one of the front and/or rear pairs of buckling struts 11 to be provided with bottom and top hinges 15 and 16 disposed with a predetermined amount of overhang 18, also referred to as the skid base, transversely relative to the front and/or rear statically-redundant fastener members 14.

In FIGS. 5 and 6, the buckling struts 11 presents a deformable body 20 mounted in removable manner by means of screws or rivets 21 between the bottom and top hinges 15 and 16.

In this case, the body 20 of the buckling strut 11 presents a section 22 that is polygonal, specifically that is rectangular with its long side 23 oriented longitudinally in the direction X.

Furthermore, the deformable body 20 of the buckling strut 11 as shown in FIG. 5 is made essentially of steel or of a composite material including glass or carbon fibers.

FIG. 5 shows that the bottom hinge 15 or the top hinge 16 of a buckling strut 11 comprises a ball joint 24. These ball joints 24 of a strut 11 present respective pivot centers that are located perceptibly off-center transversely, by an off-center distance 25, as shown in FIG. 5.

It will be understood that the ball joints 24 form a hinge version of the statically-redundant fastener members, referred to above under the reference 14.

Because of this off-center distance 25, the pivot center of each hinge 15 or 16 of a buckling strut is offset outwards relative to the undercarriage 2 away from the neutral fiber 26 of the deformable body of the strut 11.

What is claimed is:

1. An undercarriage for a rotary wing aircraft having a carriage with a force take-up structure, the undercarriage comprising:

two landing skids extending in a longitudinal direction below the carriage and spaced apart laterally from a midplane of the carriage, each skid adapted to absorb a fraction of energy that is applied thereto during a landing under normal conditions by deforming elastically;

a pair of transverse elements connecting the two landing skids and disposed in a plane perpendicular to the longitudinal direction of the undercarriage and adapted to absorb energy that is applied thereto during a landing under normal conditions by deforming elastically, the pair of transverse elements including a front transverse element and a rear transverse element spaced apart from each other in the longitudinal direction;

a connection system connecting the undercarriage to the force take-up structure of the aircraft and absorbing energy that is applied thereto during a crash by deforming plastically in a controlled manner, the connection system including a pair of front buckling struts and a pair of rear buckling struts, each strut of the pair of front buckling struts, and the pair of rear buckling struts being plastically deformable in a crash, each of the buckling struts being coupled to each of the transverse members with a bottom hinge; and assembly means providing statically-redundant coupling between the force take-up structure of the aircraft and the pair of transverse elements, the assembly means located along the pair of transverse elements between each of the front pair of buckling struts and between each of the rear pair of buckling struts, the assembly means having at least one statically-redundant fastener member, wherein each of the of transverse elements includes an endpiece section that extends transversely on either side of the undercarriage an offset distance outwards transversely and downwards from the bottom hinge of the pair of buckling struts.

2. The undercarriage according to claim 1, wherein:
the pair of rear buckling struts and the pair of front buckling struts are provided with bottom and top hinges forming part of the assembly means, said bottom and top hinges being disposed with a predetermined amount of overhang outwards transversely and downwards relative to the statically-redundant assembly means.

3. The undercarriage according to claim 1, wherein:
each skid is adapted to absorb a fraction of the energy which is applied thereto during a landing under normal conditions by deforming elastically essentially or completely in twisting; and
at least one of the front and rear transverse elements absorbing the energy which is applied thereto during a landing under normal conditions by deforming elastically or completely in bending.

4. The undercarriage according to claim 1, wherein said pair of rear buckling struts includes a ball joint assembly and the assembly means comprises at least one front statically-redundant fastener member.

5. The undercarriage according to claim 1, wherein the said front buckling struts include a ball joint assembly and the assembly means comprises at least one rear statically-redundant fastener member.

6. An undercarriage according to claim 1, wherein the pair of rear buckling struts and the pair of front buckling struts of the connection system are arranged in such a manner as to deform in the plastic range by buckling at constant force.

7. The undercarriage according to claim 1, wherein at least one of a pair of rear and front buckling struts of the connection system is arranged in such a manner as to deform in the plastic range by buckling in the event of the forces becoming greater than a predetermined threshold corresponding to a hard landing or a crash landing, with said pair of struts being arranged so that the deformation remains elastic and is free from buckling or non-existent so long as the forces remain below said predetermined threshold.

8. The undercarriage according to claim 1, wherein each of the buckling struts of at least one of said front and rear pair of said buckling struts has a deformable body, and a section that is polygonal.

9. The undercarriage according to claim 1, wherein a buckling strut deformable body in at least one of said front and rear pair of said buckling struts is made essentially of steel or of a composite material including glass or carbon fibers.

10. The undercarriage according to claim 1, wherein the at least one pair of said front and rear buckling struts is provided with bottom and top hinges, wherein at least one of the hinges comprises a ball joint.

11. The undercarriage according to claim 10, wherein at least one ball joint of a buckling strut hinge presents has a pivot center that is off-center transversely from an axis of the corresponding buckling strut.

12. The undercarriage according to claim 1, wherein the undercarriage possesses said two landing skids united by the front transverse element, thus forming "mustache" configuration.

13. The undercarriage according to claim 1, wherein the undercarriage is arranged so that energy absorption during a normal landing, a hard landing, or a crash landing is absorbed solely by the transverse elements, the friction skids, and the buckling struts by deformation that is elastic or plastic, and without involving adjoining shock absorbers and side braces.

14. The undercarriage according to claim 1, wherein the undercarriage is of a subcritical type.

15. The undercarriage according to claim 1, wherein the undercarriage is of a subcritical type.

16. The undercarriage according to claim 1, wherein the assembly means includes a rear fastener member and a front fastener member members disposed transversely to at least one of the longitudinal midplane of the aircraft and longitudinally on either side of a center of gravity of said aircraft.

17. An undercarriage for a rotary wing aircraft having a carriage with a force take-up structure, the undercarriage comprising:
two landing skids extending in a longitudinal direction below the carriage and spaced apart laterally from a longitudinal midplane of the carriage, each skid adapted to absorb a portion of energy that is applied thereto during a normal landing by deforming elastically;
a pair of transverse elements connecting the two landing skids and adapted to absorb energy that is applied thereto during a normal landing by deforming elastically, the pair of transverse elements including a front transverse element and a rear transverse element spaced apart from each other in the longitudinal direction;
a connection system connecting the transverse elements to the force take-up structure of the aircraft and absorbing the energy that is applied thereto during a crash by deforming plastically in a controlled manner, the connection system including at least one pair of buckling struts, each strut of the at least one pair of buckling struts coupled to each of the transverse members with a bottom connection wherein the connection system includes at least one front pair of buckling struts and at least one rear pair of buckling struts; and
a fastening assembly providing statically-redundant coupling between the force take-up structure of the aircraft and the transverse elements, the fastening assembly located between the at least one pair of buckling struts,
wherein each of the transverse elements includes an endpiece section that extends transversely on either side of the undercarriage an offset distance outwards transversely and downwards from the bottom connection of the pair of buckling struts.

18. An undercarriage for a rotary wing aircraft having a carriage with a force take-up structure, the undercarriage comprising:
two landing skids extending in a longitudinal direction below the carriage and spaced apart laterally from a longitudinal midplane of the carriage, each skid being adapted to absorb a portion of energy that is applied thereto during a normal landing by deforming elastically;
a pair of transverse elements connecting the two landing skids and adapted to absorb energy that is applied thereto during a normal landing by deforming elastically, the pair of transverse elements including a front transverse element and a rear transverse element spaced apart from each other in the longitudinal direction;

a connection system connecting the transverse elements to the force take-up structure of the aircraft and absorbing the energy that is applied thereto during a crash by deforming plastically in a controlled manner, the connection system including at least one pair of buckling struts, each strut of the at least one pair of buckling struts being coupled to each of the transverse members with a bottom connection; and a fastening assembly providing statically-redundant coupling between the force take-up structure of the aircraft and the transverse elements, the fastening assembly being located between the at least one pair of buckling struts, wherein each of the transverse elements includes an endpiece section that extends transversely on either side of the undercarriage an offset distance outwards transversely and downwards from the bottom connection.

19. The undercarriage according to claim 18, wherein the at least one pair of buckling struts includes a pair of rear buckling struts and a pair of front buckling struts, each of the buckling struts being provided with a bottom hinge and a top hinge.

20. The undercarriage according to claim 18, wherein the fastening assembly includes a rear fastener member connected to the rear transverse member and a front fastener member connected to the front transverse member, the rear transverse member and the front transverse member being located transversely to at least one of the longitudinal midplane of the aircraft and longitudinally on either side of a center of gravity of said aircraft.

* * * * *